(12) United States Patent
Van Bommel et al.

(10) Patent No.: US 12,025,290 B1
(45) Date of Patent: Jul. 2, 2024

(54) ACOUSTIC LIGHTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Johannes Petrus Maria Ansems, Hulsel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/288,396

(22) PCT Filed: May 10, 2022

(86) PCT No.: PCT/EP2022/062560
§ 371 (c)(1),
(2) Date: Oct. 26, 2023

(87) PCT Pub. No.: WO2022/243100
PCT Pub. Date: Nov. 24, 2022

(30) Foreign Application Priority Data

May 18, 2021 (EP) ..................................... 21174234

(51) Int. Cl.
*F21S 8/04* (2006.01)
*F21V 3/04* (2018.01)
(Continued)

(52) U.S. Cl.
CPC ................ *F21S 8/04* (2013.01); *F21V 3/049* (2013.01); *F21V 7/05* (2013.01); *F21V 13/02* (2013.01);
(Continued)

(58) Field of Classification Search
CPC . F21S 8/04; G10K 11/162; E04B 1/84; E04B 9/32; G02B 6/0073
See application file for complete search history.

(56) References Cited

U.S. PATENT DOCUMENTS

| | | | |
|---|---|---|---|
| 2013/0148357 A1 | 6/2013 | Johnston et al. | |
| 2016/0186942 A1* | 6/2016 | De Gier | F21V 11/14 |
| | | | 362/253 |

(Continued)

FOREIGN PATENT DOCUMENTS

| | | |
|---|---|---|
| CH | 708188 A2 | 12/2014 |
| EP | 2821990 A1 | 1/2015 |

(Continued)

*Primary Examiner* — Karabi Guharay

(57) ABSTRACT

The present invention generally relates to the field of acoustically absorbing lighting devices, and in particular to an acoustic lighting tiles. Such an acoustic lighting tile (100) comprises a first light source (101) and a light guide panel (102). The first light source (101) is configured to provide, in operation, a first light source light. The light guide panel (102) comprises a bottom surface (111), a top surface (112) opposite to the bottom surface (111), and a first edge surface (113) that extends between the bottom surface (111) from the top surface (112), the first edge surface (113) being configured to receive the first light source light from the first light source (101). The light guide panel (102) comprises a plurality of slits (114), and at least part of each slit of the plurality of slits (114) tapers towards the first edge surface (113).

14 Claims, 6 Drawing Sheets

(51) Int. Cl.
*F21V 7/05* (2006.01)
*F21V 13/02* (2006.01)
*G10K 11/162* (2006.01)

(52) U.S. Cl.
CPC ........ *G10K 11/162* (2013.01); *F21V 2200/20* (2015.01)

(56) References Cited

U.S. PATENT DOCUMENTS

2019/0339443 A1 11/2019 Ross et al.
2020/0208811 A1* 7/2020 Ross ........................ F21V 7/10

FOREIGN PATENT DOCUMENTS

| EP | 2886950 A1 | 6/2015 |
| EP | 2886950 B1 | 7/2017 |
| KR | 20140072635 A | 6/2014 |
| WO | 2010027942 A1 | 3/2010 |
| WO | 2019155112 A1 | 8/2019 |

* cited by examiner

ACOUSTIC LIGHTING DEVICE

CROSS-REFERENCE TO PRIOR APPLICATIONS

This application is the U.S. National Phase application under 35 U.S.C. § 371 of International Application No. PCT/EP2022/062560, filed on May 10, 2022, which claims the benefit of European Patent Application No. 21174234.1, filed on May 18, 2021. These applications are hereby incorporated by reference herein.

FIELD OF THE INVENTION

The present invention generally relates to the field of acoustically absorbing lighting devices, and in particular to light-emitting acoustic tiles (acoustic lighting tiles).

BACKGROUND OF THE INVENTION

The sound level in a room may be reduced by the use of acoustically absorbing tiles, also called acoustic tiles. Acoustic tiles are typically arranged in a grid system covering the surfaces of a room, such as ceiling and wall. To illuminate the room from the ceiling, lighting devices may for example be arranged on the outside of the acoustic tiles (i.e. on the side of the tiles facing the room), between the acoustic tiles in the grid, or as dedicated lighting tiles replacing some of the acoustic tiles in the grid. Since lighting devices typically absorb less sound than acoustic tiles of similar dimensions, their presence in the ceiling may adversely affect the acoustic properties of the ceiling and may thereby adversely affect the sound level in the room. Therefore, a trade-off is typically made between desired acoustic properties and desired quality of illumination. In particular, in order to limit their impact on the overall acoustic properties of the ceiling, lighting devices often cover only small portions of the ceiling, while sound-absorbing surfaces cover the major part of the ceiling. Such a design, however, causes restrictions on how the room may be illuminated.

One way to provide illumination in a grid system for acoustic tiles is to integrate light sources in the acoustic tiles. In U.S. Pat. No. 9,939,147 B2, an acoustic lighting tile is disclosed that comprises a cavity having a sidewall forming an opening in the cavity. The acoustic element absorbs sound incident to the cavity. A light source carrier is arranged along the sidewall and extends a first distance along a horizontal direction into the cavity. A light source is mounted on the light source carrier and emits lights in a vertical main direction into the cavity, away from the opening of the cavity. A reflective surface reflects at least a subset of the light emitted by the light source towards the opening. A diffusing element at least partially covers the opening at a second distance from the light source carrier and diffuses light passing through the opening. The second distance is at least as large as the first distance. The distance between the light source carrier and the diffusing element provides a mixing space that facilitates the provision of more uniform illumination.

SUMMARY OF THE INVENTION

The acoustic lighting tile according to the above-mentioned prior art may have a thickness because of the arrangement of light source carriers with reflective surfaces. This may make it difficult to configure with the neighboring ceiling acoustic tiles, which are relatively thinner. Therefore, it would be desirable to provide an acoustic lighting tile (i.e. light-emitting acoustic tile), with alternative and/or improved designs that may have a compact and slim form factor and can yet facilitate the provision of the desired illumination while maintaining the desired level of sound absorption.

It is an object of the present invention to provide an acoustic lighting tile overcoming, or at least alleviating, one or more of the above-mentioned drawbacks. In particular, it would be desirable to facilitate the provision of a desired illumination while maintaining a desired level of sound absorption with an acoustic lighting tile that is a slim form factor.

According to a first aspect, this and other objects are achieved by an acoustic lighting tile comprising, a first light source configured to provide, in operation, a first light source light, and a light guide panel comprising a bottom surface, a top surface opposite to the bottom surface, and a first edge surface that extends between the bottom surface from the top surface, the first edge surface being configured to receive the first light source light from the first light source. The light guide panel comprises a plurality of light guide structures at least partly separated by a plurality of slits, and at least part of each slit of the plurality of slits tapers towards the first edge surface. Furthermore, the acoustic lighting tile comprises an acoustic panel facing the bottom surface of the light guide panel, the acoustic panel being adapted to absorb at least a subset of sound waves incident to the light guide panel.

In the context of the present invention, the term 'light guide panel' may refer to a planer light propagating structure where the light propagation is accomplished by means of total internal reflection (TIR). The bottom surface and the top surface may be considered as the major surfaces. The edge surface of the light guide panel may be considered as a surface the extends between the bottom surface and the top surface. One portion of such edge surface referred herein as a first edge surface may be used as a light incoupling portion that may receive light from a first light source. Hence, the coupled light may experience total internal reflection between the bottom surface and the top surface and subsequently transmit towards the opposite edge portion of the light guide panel.

In the context of the present invention, the term 'slit' may be understood as an elongated opening in the light guide panel, which may be also considered as an elongated through-hole. A slit may be long and have a narrow cut or opening through a light guide panel, wherein the opening may be seen between the bottom surface and the top surface of the light guide panel.

The light guide panel may have a perimeter that can have a shape chosen from a polygon, a circle, a part of a circle, or an oval.

The first light source may comprise a plurality of linear LED arrays (for example, a LED strip) arranged to face the first edge surface such that the light emitted by the first light source in operation is coupled into the light guide panel. The first light source and the first edge surface of the light guide panel may have an intermediate element(s) that improves the incoupling of light into the light guide panel, for example, optics or adhesive.

In the context of the present invention, the term 'taper' may be understood as a reduction of thickness or width towards one end. In this context, at least part of each slit may taper towards the first edge surface. Each of the plurality of slits may have a slit width, Ws that gradually increases and/or decreases along at least a portion of the slit. Therefore, a proximal end of a slit with respect to the first edge surface may have a minimum slit width, Wmin, and a distal end of the slit with respect to the first edge surface may have a maximum slit width, Wmax.

The plurality of slits of the light guide panel may comprise at least 5 slits. Preferably the plurality of slits of the light guide panel comprises at least 10 slits, more preferably the plurality of slits of the light guide panel comprises at least 15 slits, most preferably the plurality of slits of the light guide panel comprises 20 slits.

The light guide panel may comprise at least 5 light guide structures. Preferably the light guide panel comprises at least 10 light guide structures, more preferably the light guide panel comprises at least 15 light guide structures, most preferably the light guide panel comprises at least 20 light guide structures.

One may choose to have a set of the plurality of slits for the light guide panel, the slits may be comparably similar to each other, each slit having characteristic Ws changing along a length of a slit that is the same or at least comparably same with respect to other slits from the set.

One may choose to have a set of the plurality of slits for the light guide panel, the slits may be comparably different from each other, each slit having characteristic Ws changing along a length of a slit that is the difference with respect to other slits from the set.

Each slit of the plurality of slits may have a main axis. Such a main axis can be considered as a line that is a line of symmetry. The line of symmetry can be defined as the axis or imaginary line that passes through the center of each slit from the plurality of slit and divides it into identical halves.

Each slit of the plurality of slits may have a main axis, wherein each of the main axes may be configured perpendicular to the first edge surface of the light guide panel.

Each slit of the plurality of slits may have a main axis, wherein each of the main axes may be configured perpendicular to the first edge surface and parallel to each other.

The light guide panel may have a rectangular, or a square, or a polygonal perimeter, and the plurality of slits may be configured perpendicular to the first edge surface and parallel to the bottom surface and/or the top surface.

Each slit of the plurality of slits may have a main axis that is configured substantially parallel to each other.

Here 'substantially parallel' is understood to have angles between the main axes to be preferably zero degrees, but no more than 5 or 10 degrees.

Each slit of the plurality of slits may have a length or the main axis that is arranged parallel to other lengths or main axes of the plurality of slits.

The light guide panel may have a rectangular, or a square, or a polygonal perimeter, and the plurality of slits may be configured substantially parallel to each other.

The light guide panel may have a circular, or an oval perimeter, and the plurality of slits may be configured radially (main axes of the plurality of slits going through the center of the circle or the oval).

The light guide panel may comprise a plurality of light guide structures at least partly separated by the plurality of slits. Each of the plurality of slits may have a slit width, Ws that gradually increases and/or decreases along at least a portion of the slit. While each of the plurality of light guide structures may have a light guide structure width, Wg that gradually decreases and/or increases, respectively, complementary to the slit width, Ws along at least a portion of the light guide structure. Therefore, the light guide structure may be joined with a light guide portion that is adjacent to the light incoupling edge portion (edge surface) of the light guide panel and a distal portion of the light guide structure may have a minimum light guide structure width, Wg(min) complementary to the maximum width, Wmax of the slit. The minimum light guide structure width, Wg(min) of the light guide structure is defined by mechanical robustness and maybe around 1 mm or more. The plurality of light guide structures may be connected e.g. as one piece such as a monolithic element.

The light guide panel may comprise a plurality of light guide structures at least partly separated by the plurality of slits, each of the plurality of slits may have a slit length, Ls, and each of the plurality of light guide structures may have a light guide structure length, Lg that may be defined as a (first) distance from the first edge surface of the light guide panel to a tapered end of the light guide structure, and wherein $0.6*Lg<Ls<0.98*Lg$. Preferably $Ls>0.6*Lg$, more preferably $Ls>0.7*Lg$, most preferably $Ls>0.8*Lg$. The obtained effect is that the light guide panel is more open which improves its acoustic properties. Preferably $Ls<0.98*Lg$, more preferably $Ls<0.95*Lg$, most preferably $Ls<0.9*Lg$. The obtained effect is that the light guide panel is more rigid, reliable, and/or self-supporting.

The plurality of slits that tapers towards the first edge surface of the light guide panel, where the first edge surface being configured to receive the first light source light from the first light source. Therefore, the light guide structures receive light from the first edge surface and that propagates towards the tapered end at a distal position from the first edge surfaces. Because of the tapering of the light guide structures, the light is squeezed out of the light guide structure. Hence, the plurality of tapering light guide structures may be considered as a light outcoupling mean. Such an implementation may provide a slim form factor for an acoustic lighting tile, while the openings from the plurality of slits providing efficient transmission of sound waves and also simultaneously provide light outcouple means. Besides the plurality of slits within the light guide panel may also offer a reduction in material usage and thus weight.

The acoustic lighting tile may comprise a second light source arranged from providing, in operation, a second light source light. The light guide panel may have a second edge surface opposite to the first edge surface, the second edge surface may be configured to receive the second light source light from the second light source, and at least part of each slit of the plurality of slits tapers towards the second edge surface.

The above configuration may offer an improved homogeneity of the outcoupling of light from the light guide panel when compared to a light guide panel having a plurality of slits towards a single edge surface with a single light source.

Each slit of the plurality of slits has a maximum slit width, Wmax, and a minimum slit width, Wmin, wherein Wmax and/or Wmin of the plurality of slits may be arranged at a same distance from the first edge surface. The light guide panel may have a light guide panel length which is defined between the first edge surface and an opposite edge surface i.e. a second edge surface. Wmax may be arranged closer to the second edge surface than the first edge surface e.g. Wmax be arranged at the second edge surface. Alternatively, Wmax may be arranged at half of the light guide panel length.

The acoustic lighting tile may comprise a center plane perpendicular to the top surface of the light guide panel, and each of the plurality of slits may have a maximum slit width, Wmax lying on the center plane.

The center plane may be equidistant from the first edge surface and the second edge surface.

The minimum slit width, Wmin may be selected from a range from 0.2 mm to 2 mm, and/or wherein the maximum slit width, Wmax may be selected from a range from 3 mm to 30 mm.

The minimum slit width, Wmin may preferably be selected from a range from 0.7 mm to 2 mm.

It is to be understood that the maximum slit width, Wmax may be larger than the minimum slit width, Wmin.

Most of the energy in the human voice is cantered between 300 Hz and 1500 Hz. Therefore in this range, most sound absorption is necessary. In the article "Normal Incidence of Sound Transmission Loss from Perforated Plates with Micro and Macro Size Holes", Advances in Acoustics and Vibration Volume 2014 by A. Putra and A. Y. Ismail transmission loss as a function of frequency is described. According to this article, the above-mentioned magnitudes of the minimum slit width, Wmin, and/or the maximum slit width, Wmax may be sufficient for obtaining high sound transmission, so that sound wave is not reflected from the surface of the light guide panel but is transmitted.

The light guide panel may have a light guide panel area, Ag, and the plurality of slits has a slit area, Ao, and Ao may be selected from a range from 10% to 50% of Ag.

Preferably, Ao may be selected from a range from 20% to 50% of Ag, more preferably, Ao may be selected from a range from 30% to 50% of Ag, and most preferably, Ao may be selected from a range from 40% to 50% of Ag.

For sound transmission, the slit area, Ao that corresponds to the opening area within the light guide panel may be relevant, in addition to the width, Ws of the slit. The light guide panel area, Ag may include the area of the plurality of the light guide structures and/or the plurality of slits. The plurality of slits may have a slit area, Ao that is the combined area of all the slits.

The light guide panel may comprise a plurality of light outcoupling means on the bottom surface and/or the top surface.

Preferably, the light guide panel may comprise a plurality of light outcoupling means on the bottom surface such that light is mostly outcoupled from the bottom surface in the direction of the top surface of the light guide panel.

In addition to the tapering of the light guide structures for light outcoupling, additional light outcoupling means such as dot matrix or similar reflective features may be present on the bottom surface and/or the top surface of the light guide panel for providing desired light outcoupling efficiency and direction. For example, having light outcoupling means such as dot matrix or similar reflective features present on the bottom surface may improve light outcoupling from the top surface of the light guide panel.

The light guide panel may comprise light scattering particles embedded within the light guide panel acting as an alternative light outcoupling means.

The distribution, density, and size of the light outcoupling means such as dot matrix or similar reflective features may vary along the length of the light guide structure for optimum light outcoupling efficiency and direction.

The light outcoupling means may also be present on the side surfaces of the plurality of light guide structures, the side surface that extends between the bottom surface from the top surface within the plurality of slits.

Each of the plurality of light guide structures may have a cross-section having a shape selected from one or more of a polygonal shape, a round shape, and an oval shape.

The above-mentioned cross-sections may improve sound transmission property through the plurality of slits of the light guide panel.

In the context of the present invention, the term 'acoustic lighting tile' having a light guide panel with tapering slits is to be understood to be a lighting device or apparatus that provides lighting functionality and acoustic functionality, wherein the acoustic functionality may be understood to include sound wave transmissivity through the aforementioned light guide panel. Therefore, such an 'acoustic lighting tile' may be installed with a surface (ceiling or another similar surface) having acoustic tiles (for example: perforated ceiling acoustic tiles) for providing absorption of sound waves that are transmitted through the light guide panel.

The acoustic panel typically provides an acoustic dampening function in order to preserve the desired acoustics in the enclosed space in which they are fitted. The acoustic panel may increase the sound-absorbing properties of the acoustic lighting tile and increases its usability as a replacement and/or a complement to regular acoustic tiles (i.e. acoustic tiles without light sources). Hence, the use of the acoustic panel, in combination with the reduced impact of the obstruction of light, as described above, facilitates the provision of a desired illumination while maintaining a desired level of sound absorption.

The acoustic panel may be any suitable acoustically absorbent material that takes any suitable shape such as an acoustically absorbent mat or tile or the like. The suitable acoustic panel includes fibrous materials that are commonly deployed in traditional acoustic tiles, such as glass wool, foam-based materials such as melamine foam, polyurethane foam, and so on, as well as micro-perforated plates. Such micro-perforated plates may have a surface area of which about 0.2-0.5% is perforated with microscopic holes having a diameter in a range of 0.05-0.5 mm although other dimensions are of course equally feasible. Such micro-perforated plates may be folded in order to achieve the desired dimensions of the acoustic panel. The acoustic panel, e.g. the micro-perforated plate or any other acoustically absorbent material, may be filled with a substance that increases the acoustic absorbance of the acoustic panel to further improve the acoustic performance of the acoustic lighting tile.

The acoustic panel may comprise an outward surface facing the bottom surface of the light guide panel that is light reflective. The light reflectance property of the outwards surface may be preferably at least 80%, more preferably at least 85%, most preferably at least 90%.

The acoustic panel may comprise an outward surface facing the bottom surface of the light guide panel, that may be covered by a light-reflective coating, e.g. a white paint coating or a reflective foil, in order to minimize light losses of light outcoupled by the light guide panel that is incident on the acoustic panel. In an example embodiment, the acoustic panel such as glass wool or the like is covered by a micro-perforated plate facing the bottom surface of the light guide panel, in which the micro-perforated plate not only acts as a further acoustically absorbent material but additionally acts as a light reflector to increase the optical efficiency of the acoustic lighting tile. To this end, the micro-perforated plate may be coated with a reflective coating, e.g. a white paint or the like.

The acoustic lighting tile may comprise a rim that at least partially covers the first light source and/or the second light source. In addition, the rim may also at least partially cover the light guide panel. The rim may cover the top surface and/or the bottom surface in close proximity to the first edge surface and/or the second edge surface of the light guide panel.

The rim may shield the direct view of the first light source and/or the second light source.

The rim may also shield the direct view of the part of the light guide panel where the outcoupling light is not homogeneous. This is perhaps due to the pitch of the LEDs that may be present in the first and/or the second light source, or the light guide structures may not have optimum tapering, or when a one-sided light source that results in reflected light at the other end of the light guide panel.

The acoustic lighting tile may comprise a light exit window facing the top surface of the light guide panel.

The rim may be part of the light exit window or the rim may enclose a light exit window.

The acoustic lighting tile may comprise a light-diffusing element facing the bottom surface of the light guide panel, the light-diffusing element may be adapted to transmit at least a subset of sound waves incident to the light guide panel.

The acoustic lighting tile may comprise a light-diffusing element facing the acoustic panel, the light-diffusing element may be adapted to transmit at least a subset of sound waves.

The acoustic lighting tile may comprise a light-diffusing element facing the top surface of the light guide panel, the light-diffusing element may be adapted to transmit at least a subset of sound waves incident to the light guide panel.

The light-diffusing element may be a non-woven or a woven fabric.

The light-diffusing element may allow the transmission of light and sound waves.

The light-diffusing element may be a porous diffuser, for example, a fabric that allows the transmission of light and sound waves.

The light-diffusing element may at least partially cover the light exit window of the acoustic lighting tile. The light-diffusing element at least partially diffuses light passing through the light exit window, which may improve the uniformity of the spatial and/or angular distribution of the light output of the acoustic lighting tile.

The light-diffusing element may be arranged at a (second) distance from the light guide panel to create a mixing space between the light guide panel and the light-diffusing element, which may improve the homogeneity of outcoupled light from the light guide panel and exiting towards the light exit window. If a large width for the slits is to be used, and/or a low number of slits, the (second) distance with respect to the light-diffusing element should be increased to avoid visibility of the slits through the diffuser.

The (second) distance may be selected from a range from 1 mm to 100 mm, preferably the (second) distance may be selected from a range from 2 mm to 75 mm, and most preferably the (second) distance may be selected from a range from 5 mm to 50 mm.

At least a part of a rim of at least one of the edge surfaces may be folded and the light-diffusing element may be arranged in abutment to the fold of the rim. The fold of the rim increases the smoothness of a surface that is in contact with the light-diffusing element, and reduces the risk of tearing and/or damaging the light-diffusing element. The fold of the rim may increase the mechanical stiffness of the rim and/or the acoustic lighting tile.

The light-diffusing element may be at least partially light transmissive, i.e. light of at least some wavelengths/frequencies may pass through at least a part of this portion to provide a more uniform illumination (the light may e.g. be diffused when passing through, or it may pass through unaffected).

The acoustic lighting tile may comprise a light-diffusing element such as a volume diffuser, e.g. a material containing particles or refractive index variations inside its volume causing scattering to take place in the volume of the material rather than at faces/surfaces of the material due to a surface structure arranged on an outside, relative to the light guide panel.

The woven fabric may comprise openings having a minimum diameter, and said fibers have diameters that are smaller than said minimum diameter. This ensures that the light guide panel arrangement is obscured from direct view under certain viewing angles in a particularly effective manner. For example, each of said openings may have a diameter in a range of 20-500 micrometers in order to give the woven fabric the desired optical and acoustical transparency.

Preferably, the non-woven fabric may have a constant optical density such that a constant optical performance over the full area of the light exit window of the acoustic lighting tile is achieved. In this case, the non-uniformity of the outcoupling light from the light guide panel can be effectively avoided or suppressed. To this end, the non-woven fabric may be composed of felt, (hollow) fibers, in which the fibers may be linearly aligned substantially parallel to the plane of the light exit window of the lighting module, such that light and sound waves can pass around the fibers without significantly affecting the light output efficiency and acoustic absorbance of the acoustic light tile. However, any type of felt having a constant optical density, e.g. felts spun in a rotating manner, a felt having different individual layers of fibers stacked on top of each other in sinusoidal or slightly cross-stacked layering, and so on.

The non-woven fabric may be composed of fibers having a diameter in a range of 5-200 micrometers ($\mu$m). Preferably, the non-woven fabric may be composed of fibers having a diameter in a range of 5-100 micrometers. More preferably, the non-woven fabric may be composed of fibers having a diameter in a range of 5-50 micrometers.

According to the second aspect of the present invention, a luminaire is provided comprising at least one acoustic lighting tile as described above.

The luminaire may further comprise fixing means for fixing the luminaire to a wall or a ceiling. One possible fixing means can be 'T-grid'.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

The above, as well as additional objects, features, and advantages of the disclosed devices, methods, and systems, will be better understood through the following illustrative and non-limiting detailed description of embodiments of devices, methods, and systems, with reference to the appended drawings, in which.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
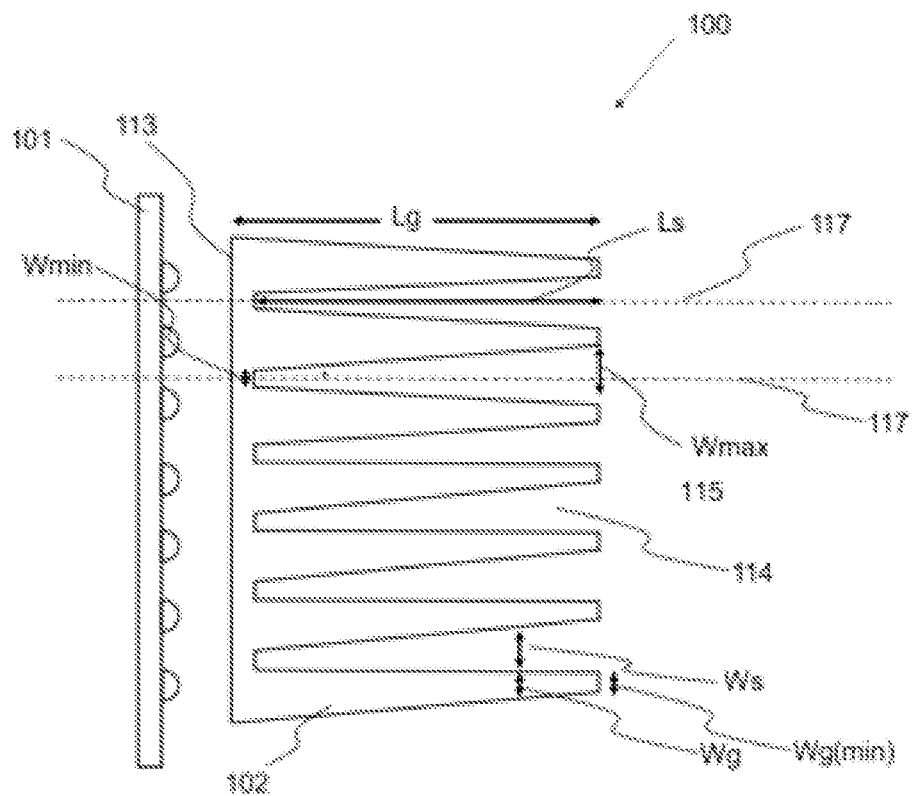
FIG. 1 shows a schematic view of an acoustic lighting tile.

Referring initially to FIG. 1, a schematic view of an acoustic lighting tile 100 comprising a light guide panel 102 is shown. The light guide panel 102 comprises a first edge surface 113 that may be considered as a surface the extends between a bottom surface and a top surface, two major surfaces of the light guide panel 102. The first edge surface 113 may be configured as a light incoupling portion that may receive light from a first light source 101. Hence, the coupled light may experience total internal reflection between the bottom surface and the top surface and subsequently transmit towards the opposite edge portion of the light guide panel.

The light guide panel 102 further comprises a plurality of slits 114 that tapers towards the first edge surface 113. Therefore, the plurality of slits 114 comprises slit width, Ws that gradually increases and/or decreases along at least a portion of the slit. Hence, the plurality of slits 114 has a minimum slit width, Wmin that is proximal with respect to the first edge surface 113 and a maximum slit width, Wmax that is distal with respect to the first edge surface 113. In FIG. 1, all the slits are depicted to have the same slit length, Ls, and the changing of the slit width, Ws along the slit length, Ls is also the same. The minimum slit width, Wmin, and the maximum slit width, Wmax is arranged at the same distance from the first edge surface 113. Each slit of the plurality of slits 114 has a main axis 117 that is configured substantially parallel to each other. The main axis 117 is depicted to be a line of symmetry that passes through the center of each slit from the plurality of slit 114 and divides it into identical halves. The main axis 117 is perpendicular to the first edge surface 113.

The minimum slit width, Wmin may be selected from a range from 0.2 mm to 2 mm for allowing sound waves impinging on the light guide panel 102 to be transmitted without substantial attenuation. The maximum slit width, Wmax may be selected from a range from 3 mm to 30 mm.

The light guide panel 101 comprises a plurality of slits 114 between a plurality of light guide structures 115. The plurality of light guide structures 115 has a wedge shape that is complementary to the plurality of slits 113. While each of the plurality of light guide structures 115 has a light guide structure width, Wg that gradually decreases and/or increases, respectively, complementary to the slit width, Ws along at least a portion of the light guide structure 115. Therefore, the light guide structure is joined with a light guide portion that is adjacent to the first edge surface 113 of the light guide panel 102 and a distal portion of the light guide structure 115 may have a minimum light guide structure width, Wg(min) complementary to the maximum width, Wmax of the plurality of slit 114. The minimum light guide structure width, Wg(min) of the light guide structure is defined by mechanical robustness and maybe around 1 mm or more.

Each of the plurality of light guide structures 115 may have a cross-section having a shape from one of a polygonal shape, a round shape, or an oval shape.

The plurality of light guide structures 115 has a light guide structure length, Lg defined as a (first) distance from the first edge surface 113 of the light guide panel 102 to a tapered end of the light guide structure 115, the tapered end being the distal portion of the light guide structure 115 having the minimum light guide structure width, Wg(min).

Each slit of the plurality of slits 114 is arranged parallel to other slits from the plurality of slits 114.

The plurality of slits 114 has a slit area, Ao that is the combined area of all the slits 114. The light guide panel has a light guide panel area, Ag that includes the area of the plurality of the light guide structures 115 and/or the plurality of slits 114. Ao may be selected from a range from 10% to 50% of Ag. Preferably, Ao may be selected from a range from 20% to 50% of Ag, more preferably, Ao may be selected from a range from 30% to 50% of Ag, and most preferably, Ao may be selected from a range from 40% to 50% of Ag.

In FIG. 1, the plurality of slits 114 is depicted to be arranged parallel to each other and also arranged perpendicular to the first edge surface 113. The first edge surface 113 is depicted to be a flat surface, and the first light source 101 is also depicted to be arranged parallel to the first edge surface 113. The first light source 101 comprises a plurality of light emitters 160 linearly arranged and each of the light emitters 160 are separated by a gap in between. It is to be understood that the first light source light may impinge on the first edge surface 113 for incoupling into the light guide panel 102. Hence, the first light source light from the first light source 101 may propagate through the light guide panel 102 by means of total internal reflection. Because of the presence of the plurality of slits 114 that are arranged perpendicular to the first edge surface 113, the propagating light can be outcoupled from the tapered plurality of light guide structures 114. Because of the tapering of the plurality of light guide structure 115, the light is squeezed out of the plurality of light guide structure 115. Hence, the tapering of the plurality of light guide structures 114 acts as a light outcoupling mean. Such an implementation may provide a slim form factor for the acoustic lighting tile 100, while the openings from the plurality of slits 114 providing efficient transmission of sound waves and also simultaneously provide light outcouple means. Besides the plurality of slits 114 within the light guide panel 102 may also offer a reduction in material usage.

Figure 2:
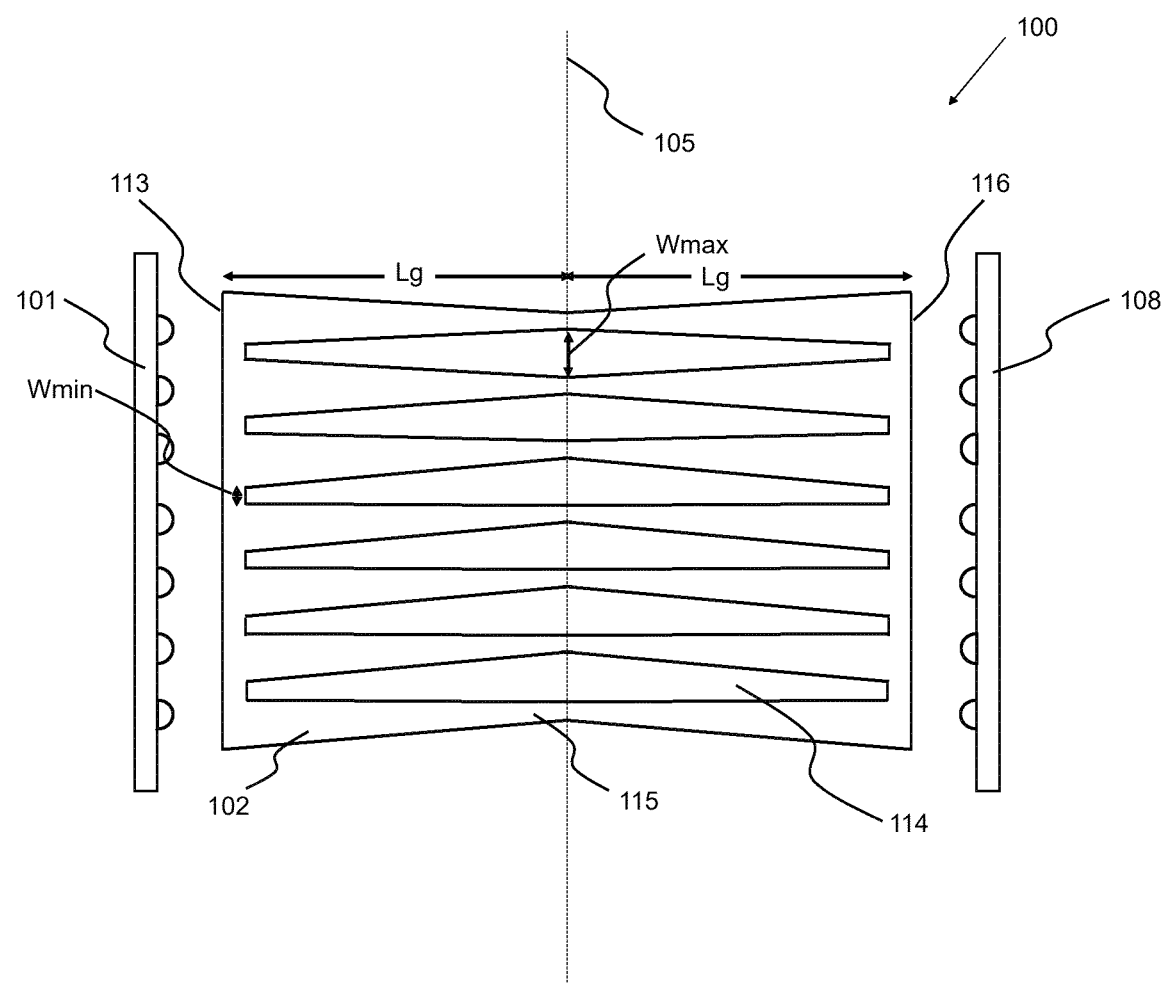
FIG. 2 shows a schematic view of another acoustic lighting tile.

FIG. 2 shows a schematic view of an acoustic lighting tile 100 that comprises a plurality of slits 114 that tapers towards a first edge surface 113 and a second edge surface 116 of the light guide panel 102. The plurality of slits 114 is arranged symmetrically with respect to a center plane 105 of the acoustic lighting tile 100. The center plane 105 is arranged equidistant from the first edge surface 113 and the second edge surface 116. And each of the plurality of slits 114 may have a maximum slit width, Wmax lying on the center plane 105. The second edge surface 116 is arranged opposite to the first edge surface 113, the second edge surface 116 is configured to receive the second light source light from the second light source 108, similar to the first light source 101. This configuration of the acoustic lighting tile 100 as shown in FIG. 2 may offer an improved homogeneity of the outcoupling of light from the light guide panel 102, when compared to the configuration shown in FIG. 1.

Figure 3:
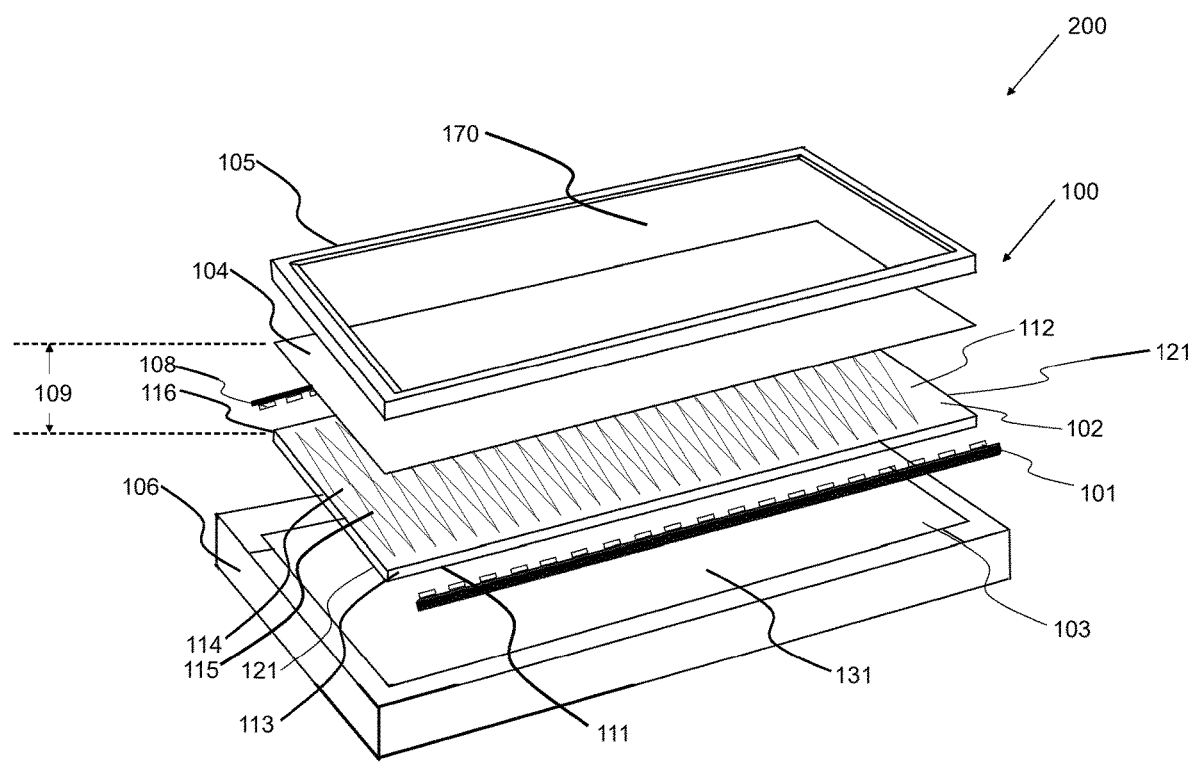
FIG. 3 shows an exploded view of a luminaire comprising an acoustic lighting tile.

FIG. 3 shows an exploded view of a luminaire 200 comprising an acoustic lighting tile 100. In FIG. 3, the light guide panel 102 is shown to have a bottom surface 111 that is facing towards an acoustic panel 103 and a top surface 112 that is facing a light diffusing element 104. The light guide panel 102 has a rectangular perimeter defined by four edge surfaces 113, 116, and 121. The light guide panel 102 comprises a plurality of slits 14 separated by a plurality of light guide structures 115. The acoustic panel 103 is adapted to absorb at least a subset of sound waves that is incident and subsequently transmitted through the light guide panel 102. Therefore, the acoustic panel 103 may provide an acoustic dampening function in order to preserve the desired acoustics in the enclosed space in which they are fitted. The acoustic panel 103 may completely or partially cover the bottom surface 111 of the light guide panel 102. The acoustic panel 103 has an outward surface 131 facing the bottom surface 111 of the light guide panel 102 that is light reflective in order to minimize light losses light outcoupled by the light guide panel 102 that is incident on the acoustic panel 105. To this end, the acoustic panel 103 may be coated with a reflective coating, e.g. a white paint or the like. Alternatively, the acoustic panel 103 may comprise light reflective material. The acoustic lighting tile 100 may comprise a light-diffusing element located in between an acoustic panel 103 and the light guide panel 102 where the light-diffusing element is adapted to transmit at least a subset of sound waves incident to the light guide panel 102. Therefore, the light-diffusing element may provide diffusing and mixing effect for the outcoupling light in the direction of the acoustic panel 103.

The acoustic lighting tile 100 comprises a light-diffusing element 104 facing the top surface 112 of the light guide panel 102, the light-diffusing element 104 is adapted to transmit at least a subset of sound waves incident to the light guide panel 102. The light-diffusing element 105 is adapted to allow the transmission of outcoupling light from the light guide panel 102 and sound waves incident to the light guide panel 102. The light-diffusing element 105 may be a non-woven or a woven fabric.

The light-diffusing element 105 is arranged at a (second) distance 109 from the light guide panel 102 to create a mixing space between the light guide panel 102 and the light-diffusing element 104, which may improve the homogeneity of outcoupled light from the light guide panel 102. The (second) distance 109 may be selected from a range from 1 mm to 100 mm, preferably the (second) distance 109 may be selected from a range from 2 mm to 75 mm, and most preferably the (second) distance 109 may be selected from a range from 5 mm to 50 mm.

The acoustic lighting tile 100 comprises a rim 105 that at least partially covers the first light source 101 and the second light source 108. In addition, the rim 105 at least partially covers the light guide panel 102, at least the portion adjacent to the edge surfaces. As a result, the rim 105 can shield the direct view of the first light source 101 and the second light source 108. Additionally, the rim 105 may also shield the direct view of the part of the light guide panel 102 where the outcoupling light is not homogeneous.

The rim 105 encloses a light exit window 107 that is facing the top surface 112 of the light guide panel 102.

In addition to a plurality of slits 114, the light guide 102 as shown in FIGS. 1, 2, and 3 may also comprise a plurality of light outcoupling means on the bottom surface 111 and/or the top surface 112 of the light guide panel 102 for providing desired light outcoupling efficiency and direction. Preferably, on the bottom surface 111 such that light is mostly outcoupled from the bottom surface 111 in the direction of light exit window 170. Having light outcoupling means such as dot matrix or similar reflective features present on the bottom surface 111 may improve light outcoupling from the top surface 112 towards the light exit window 170. The light guide panel 102 may comprise light scattering particles embedded within the light guide panel 102 acting as an alternative light outcoupling means. The distribution, density, and size of the light outcoupling means such as dot matrix or similar reflective features may vary along the length of the light guide structure for optimum light outcoupling efficiency and direction.

In FIG. 3, the luminaire 200 comprises a housing 106 that is arranged to accommodate the sandwiches an acoustic panel 103, a light guide panel 102, a light-diffusing element 104, and a rim 105 enclosing the light guide panel 102 with the first light source 101 and the second light source 108. The rim 105 may additionally enclose the light-diffusing element 104 with the light guide panel 102 along with side-edge facing first light source 101 and second light source 108.

Figure 4:
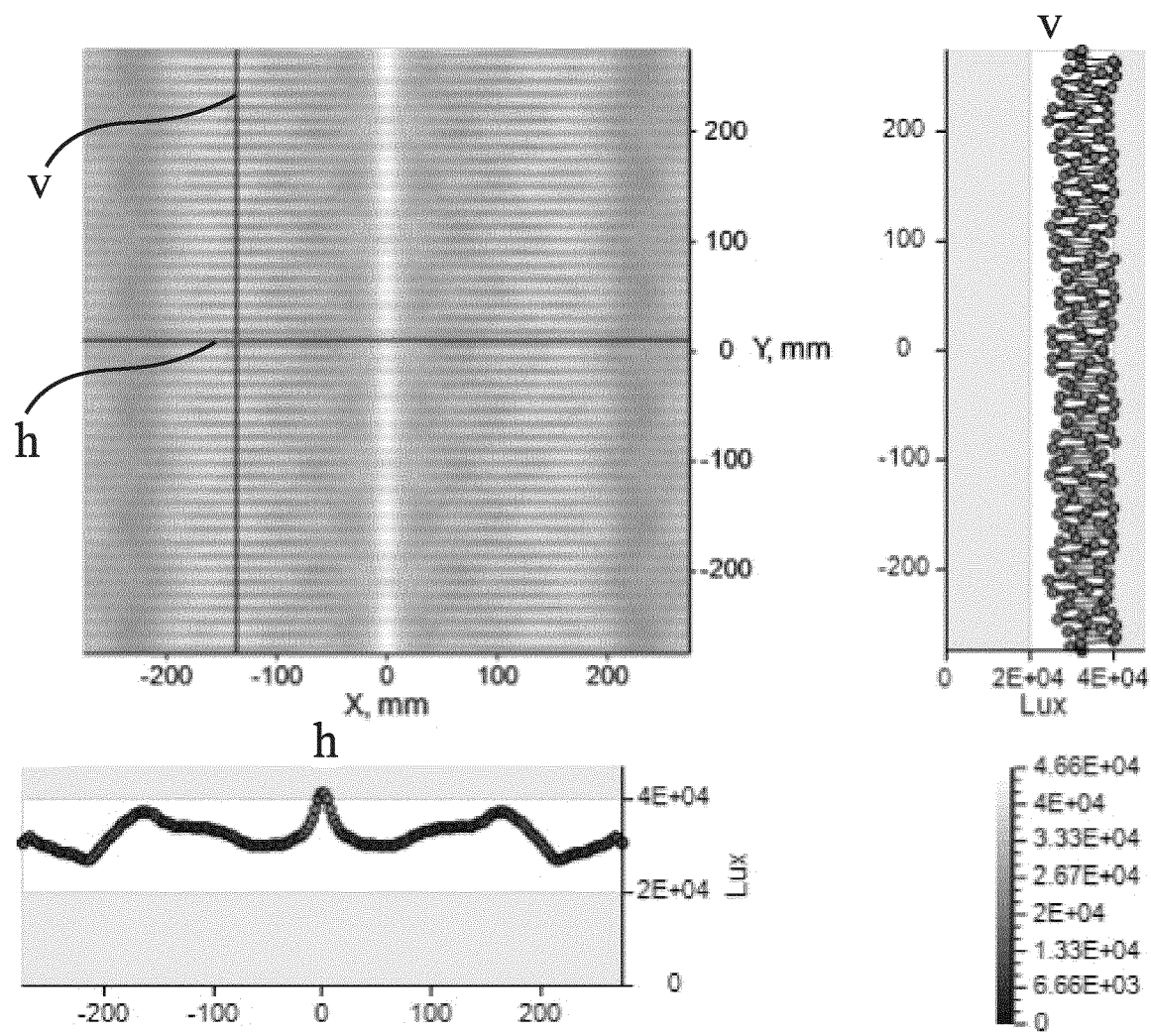
FIG. 4 shows a simulation result of outcoupling light from a light guide panel.

FIG. 4 shows a simulation result of outcoupling light from a light guide panel 102 as shown in FIGS. 2 and 3. The light guide panel 102 having two edge surfaces, a first edge surface 113 for incoupling light from a first light source 101 and a second edge surface 116 for incoupling light from a second light source 108. In the simulation, the light guide panel 102 has dimensions 570 mm by 570 mm, therefore a square. The light guide panel 102 has a plurality of light guide structure 115 having minimum light guide width, Wg(min)=1 mm located in the center, equidistance from the first edge surface 113 and the second edge surface 116. The maximum slit width, Wmax=12 mm of the plurality of slits 114 is located in the center, equidistance from the first edge surface 113 and the second edge surface 116. The distribution of the outcoupled light in the vertical direction, v, and the horizontal direction, h are shown in FIG. 4. It can be seen in this figure, that the distribution of outcoupled light have local intensity variations along the vertical direction, v, and the horizontal direction, h above the light guide panel 102.

Figure 5:
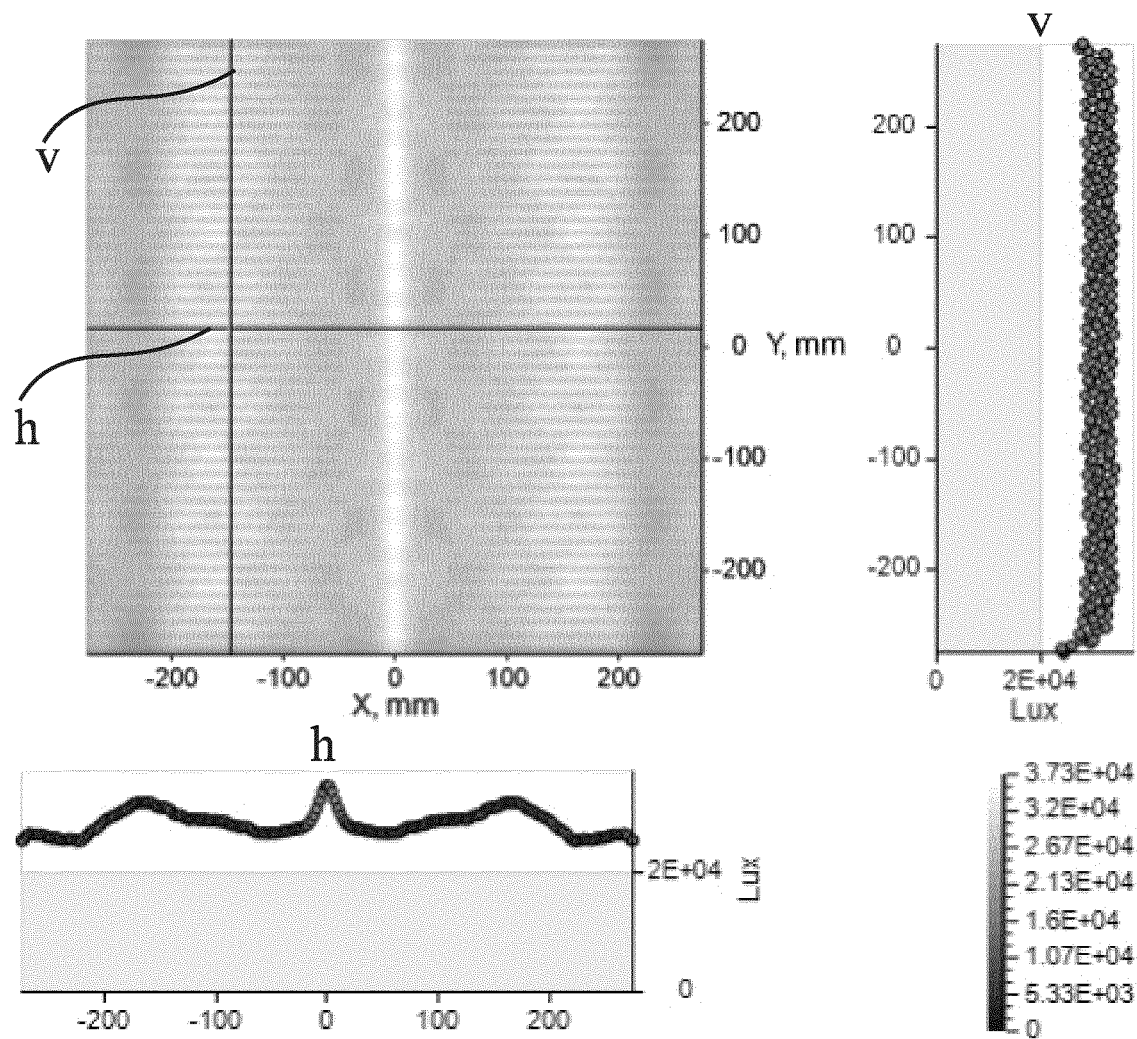
FIG. 5 shows a simulation result of outcoupling light from the light guide panel with a light-diffusing element.

FIG. 5 shows a simulation result of outcoupling light from an arrangement of the light guide panel 102 as described above, with a light-diffusing element 104 being present above the light guide panel 102 as shown in FIG. 3. The (second) distance 109 between the light guide panel 102 and the light-diffusing element 104 is considered 2 mm. In this case, it can be seen the distribution of outcoupled light along the vertical direction, v, and the horizontal direction, h above the light guide panel 102 has improved in the homogeneity over the simulation result shown in FIG. 4.

Figure 6:
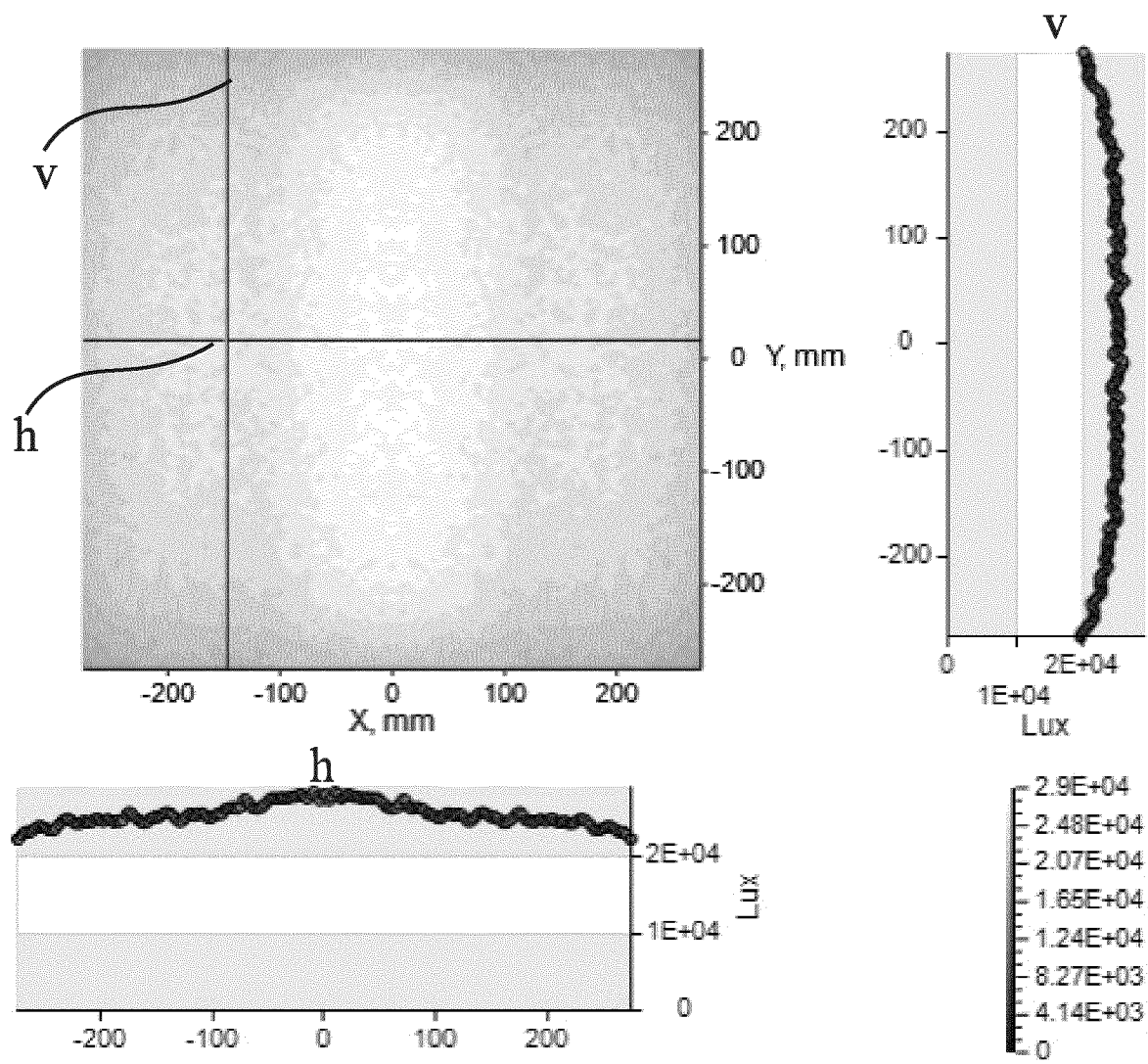
FIG. 6 shows a simulation result of outcoupling light from the light guide panel with an enhanced distance between a light guide panel and a light-diffusing element.

FIG. 6 shows a simulation result of outcoupling light from the light guide panel with an enhanced distance between a light guide panel and a light-diffusing element. By increasing the (second) distance 109 between the light guide panel 102 and the light-diffusing element 104, one may further improve the homogeneity of the outcouple light distribution, as shown in the simulation result of FIG. 6. In this case, the (second) distance 109 between the light guide panel 102 and the light-diffusing element 104 is considered 50 mm. With this condition, substantial improvement in the homogeneity of the outcoupling distribution along the vertical direction, v, and the horizontal direction, h is observed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain features are recited in mutually different dependent claims does not indicate that a combination of these features cannot be used to advantage. The various aspects discussed above may be combined in order to provide additional advantages. Further, the person skilled in the art will understand that two or more embodiments may be combined.

The invention claimed is:

1. An acoustic lighting tile comprising:
   a first light source configured to provide, in operation, a first light source light; and
   a light guide panel comprising a bottom surface, a top surface opposite to the bottom surface, and a first edge surface that extends between the bottom surface from the top surface, the first edge surface being configured to receive the first light source light from the first light source;
   wherein the light guide panel comprises a plurality of light guide structures at least partly separated by a plurality of slits;
   wherein at least part of each slit of the plurality of slits tapers towards the first edge surface, and
   wherein the acoustic lighting tile comprises an acoustic panel facing the bottom surface of the light guide panel, the acoustic panel adapted to absorb at least a subset of sound waves incident to the light guide panel.

2. The acoustic lighting tile according to claim 1, wherein each slit of the plurality of slits has a main axis that is configured substantially parallel to each other.

3. The acoustic lighting tile according to claim 1, wherein each of the plurality of slits has a slit length, Ls, and each of the plurality of light guide structures has a light guide structure length, Lg that is defined as a distance from the first edge of the light guide panel to a tapered end of the light guide structure, and wherein 0.6*Lg<Ls<0.98*Lg.

4. The acoustic lighting tile according to claim 1, wherein each slit of the plurality of slits has a maximum slit width, Wmax, and a minimum slit width, Wmin, wherein Wmax and/or Wmin of the plurality of slits are arranged at a same distance from the first edge surface.

5. The acoustic lighting tile according to claim 4, wherein the minimum slit width, Wmin is selected from a range from 0.2 mm to 2 mm, and/or wherein the maximum slit width, Wmax is selected from a range from 3 mm to 30 mm.

6. The acoustic lighting tile according to claim 1, wherein the acoustic lighting tile comprises a second light source arranged from providing, in operation, a second light source light, wherein the light guide panel has a second edge surface opposite to the first edge surface, wherein the second edge surface being configured to receive the second light source light from the second light source, and wherein at least part of each slit of the plurality of slits tapers towards the second edge surface.

7. The acoustic lighting tile according to claim 1, wherein the light guide panel has a light guide panel area, Ag, and the plurality of slits has a slit area, Ao, and wherein Ao is selected from a range from 10% to 50% of Ag.

8. The acoustic lighting tile according to claim 1, wherein the light guide panel comprises a plurality of light outcoupling means on the bottom surface and/or the top surface.

9. The acoustic lighting tile according to claim 1, wherein each of the plurality of light guide structures has a cross-section having a shape selected from one or more of a polygonal shape, a round shape, and an oval shape.

10. The acoustic lighting tile according to claim 1, wherein the acoustic panel comprises an outward surface facing the bottom surface of the light guide panel that is light reflective.

11. The acoustic lighting tile according to claim 1, wherein the acoustic lighting tile comprises a light-diffusing element facing the acoustic panel, the light-diffusing element is adapted to transmit at least a subset of sound waves.

12. The acoustic lighting tile according to claim 11, wherein the light-diffusing element is a non-woven or a woven fabric.

13. The acoustic lighting tile according to claim 1, wherein the acoustic lighting tile comprises a light-diffusing element facing the top surface of the light guide panel, the light-diffusing element is adapted to transmit at least a subset of sound waves incident to the light guide panel.

14. A luminaire comprising at least one acoustic lighting tile according to claim 1.

* * * * *